United States Patent Office 3,053,127
Patented Sept. 11, 1962

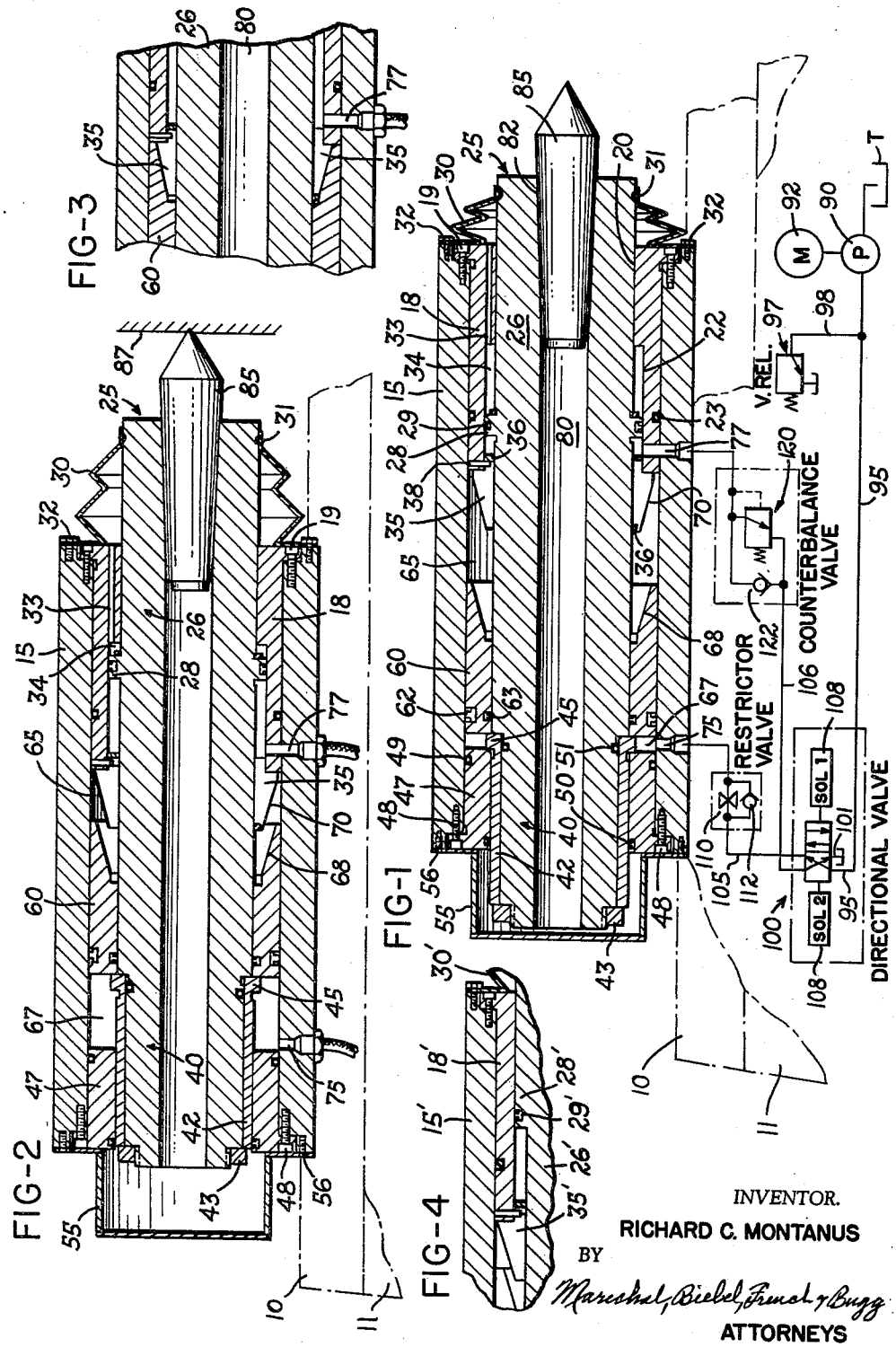

3,053,127
POWERED TAILSTOCK
Richard C. Montanus, Springfield, Ohio, assignor to The Springfield Machine Tool Company, Springfield, Ohio, a corporation of Ohio
Filed Dec. 10, 1958, Ser. No. 779,494
11 Claims. (Cl. 82—31)

This application relates to power driven clamping apparatus, particularly as applied to tailstock constructions for lathes or the like.

The present invention primarily concerns power operated tailstock mechanisms for lathes and like machinery, although it will be seen that the principles involved may be applied to a variety of machines wherein it is desired to control clamping pressure. In accordance with this invention a controlled pressure is applied to a workpiece by the center of a power operated tailstock as the center of the tailstock is engaged under power with the workpiece. Thus, the center is advanced into contact with the workpiece, exerts a predetermined maximum clamping force against the workpiece, and then is locked in clamping position. This arrangement protects the workpiece against excessive pressure from the center which may either damage the workpiece or create unwanted stresses or deflections in it, while effectively clamping the workpiece for machining operations thereon without moving the center out of alignment.

Accordingly, the primary object of this invention is to provide an improved power operated tailstock wherein the clamping force exerted upon the workpiece can be controlled so as to not to exceed a desired maximum and to maintain accurate alignment.

Another object is to provide an improved hydraulic clamping or pressure applying device wherein the clamping piece may operate through a variable length of stroke and the pressure applied by the clamping piece is so regulated that it will not exceed a predetermined maximum during the clamping stroke, and wherein the clamping piece is locked in place at the position along its operating stroke where the resistance it encounters equals the predetermined maximum pressure.

A further object of the invention is to provide a power operated tailstock including a clamping piston mounting the center and operated in the advancing or clamping direction by a power piston through an intermediate hydraulic fluid connection, wherein the maximum pressure transmitted through the fluid connection is controlled to regulate the clamping force exerted by the center against a workpiece.

Other objects and advantages of the invention will be apparent from the following description, the accompanying drawing and the appended claims.

In the drawing:

FIG. 1 is a vertical section through a power operated tailstock constructed in accordance with the invention, and including a schematic representation of a suitable hydraulic control system;

FIG. 2 is a view similar to FIG. 1 illustrating the tailstock mechanism in a moved position in the clamping direction;

FIG. 3 is a partial vertical section showing a further moved position of the parts where the clamping piston is locked against axial movement; and FIG. 4 is a partial section similar to FIG. 2, showing a modified form of the tailstock mechanism.

Referring to the drawing, which illustrates a preferred embodiment of the invention, and particularly to FIG. 1, the tailstock construction is illustrated as carried by a suitable mounting plate 10 which in turn is slidably received upon the ways 11 of a lathe or similar machine tool. Since these are conventional parts of any lathe construction, and since they form no part of the present invention, they are illustrated in phantom and the usual means for clamping the slide on the ways is not shown. The tailstock structure includes an outer cylinder or sleeve member 15 which may be suitably secured to the slide 10 in any convenient manner. Received within the forward end of sleeve 15 is a shorter sleeve member 18 having an enlarged head which is secured by bolts 19 to the sleeve 15, and including a first guiding bore or bearing surface 20 and a larger bore 22 at its opposite end. A suitable O-ring seal 23 is provided between sleeve 15 and the inner sleeve member 18.

A clamping piston member, indicated by the general reference number 25, is received through the inner sleeve member 18, having the main rod portion 26 thereof extending in bearing contact with the surface 20, and including an enlarged land 28 which provides a piston head having sliding contact with the bore 22, and including a suitable sealing ring 29. An expandable flexible seal cover 30 is secured to the forward end of piston member 25 by a suitable snap ring 31, and the other end of the cover 30 is secured in sealing relation to the main or outer sleeve 15 by a plurality of bolts 32. An equalizing passage 33 connects the space 34 on the opposite side of piston head 28 to the interior of cover 30, preventing any fluid leakage around seal 29 from resisting forward movement of the piston member 25.

A split collet 35 extends around the piston rod 26 rearwardly of the head or land 28, including the usual axial slits which separate parts of the collet, these parts being joined by integral connections 36 which are alternately located at the forward or rearward ends of the collet. This construction, as is well known, provides for contraction and expansion of the collet in a radial direction. A retaining pin 38 extends from the collet into the inner sleeve member 18, retaining collet 35 against any substantial axial movement.

The rearward end of the clamping piston rod 26 includes a section 40 of reduced diameter upon which is received a guide or bearing sleeve 42, fixed upon the piston rod by a nut 43 which is threaded to the rearward end of the rod portion 40. The forward end of bearing sleeve 42 includes an enlarged head 45 providing a rearward limit stop by engagement with a stationary bearing ring 47 which is secured by bolts 48 to the rearward end of the main or outer cylinder sleeve 15. An O-ring seal 49 preferably is provided between the stationary bearing ring 47 and sleeve 15, and a further sealing ring 50 provides a sliding seal between the stationary ring 47 and the bearing sleeve 42 which moves with the piston rod. A further O-ring or similar seal 51 may be provided beneath the enlarged head 45 and adjacent portions of the rearward part 40 of the clamping piston. A cup shaped cover 55 is secured across the rearward end of the main cylinder sleeve 15 by a number of bolts 56, passing around the rearward end 40 of the piston rod in its retracted position, as shown in FIG. 1.

An annular power piston 60 is carried in sealing relation between the main rod portion 26 of the clamping piston and the interior surface of the main cylinder sleeve 15. This power piston includes an outer seal 62 engaging the internal surface of sleeve 15 and an inner seal 63 engaging the surface of piston rod 26. Power piston 60 is freely movable in an axial direction between the head 45 and collet 35, depending upon the relative positions of the clamping piston and the cylinder member. Thus, the power piston defines with the cylinder member and the clamping piston a forward or first pressure chamber 65, and with the rearward sleeve 47 and the clamping piston a second pressure chamber 67.

The forward end of power piston 60 includes an internal annular tapered surface 68 which cooperates with the outer tapered surface 70 of collet 35 to produce radial contraction of the collet when the power piston is engaged therewith, locking the clamping piston 25 in whatever position it may have reached at the time of such engagement. Hydraulic fluid under pressure thus may be supplied to chamber 67 through an inlet passage 75, resulting in forward movement (to the right in FIG. 1) of power piston 60. Assuming that the chamber 65 is filled with hydraulic fluid, the power piston 60 serves as a movable wall means which upon forward movement will produce a force upon the rearward face of piston head 28 through the hydraulic fluid, which in turn can flow between the slits in collet 35. Thus, in the absence of relief of the hydraulic fluid from chamber 65, the substantially non-compressible fluid will transmit clamping force directly from the power piston 60 to clamping piston 25.

In order to regulate the maximum pressure applied by the clamping piston, hydraulic fluid is permitted to flow through a control passage 77 from chamber 65, after the pressure has reached a predetermined maximum. Thus, as the power piston 60 advances the clamping piston will in turn advance until it meets with a resistance sufficient to cause the pressure in chamber 65 to exceed a predetermined maximum, after which the hydraulic fluid flows through control passage 77, and clamping piston 25 remains stationary while power piston 60 completes its forward stroke and the complementary tapered surfaces 68 and 70 engage to produce radial contraction of collet 35, locking clamping piston 25 in the position where it previously had stopped.

Clamping piston 25 includes a central passage 80 having a tapered forward end 82 receiving a conventional center 85. Thus, the clamping piston 25 may advance as shown in FIG. 2 until center 85 engages a workpiece, shown schematically at 87, and when the resistance to forward movement of the center is sufficient to cause a rise in the hydraulic pressure within chamber 65 to the predetermined maximum, then the clamping piston will stop as shown in FIG. 2, while power piston 60 will continue to advance, forcing the hydraulic fluid out through control passage 77. When the complementary tapered parts of the control piston and the collet engage, as shown in FIG. 3, then the collet will be contracted radially engaging the piston rod 26 and locking the piston rod in the position where it previously had stopped.

A suitable hydraulic circuit for use with the above described mechanism is shown in connection with FIG. 1, wherein hydraulic fluid from tank T is supplied through pump 90, which is driven by motor 92, into the high pressure supply line 95. A conventional pressure relief valve 97 is connected into high pressure line 95 through a branch line 98 to provide the usual pressure relief in event of an obstruction or some other cause which might raise the pressure in line 95 above a safe limit.

High pressure line 95 passes to a two-way reversing or directional valve indicated generally at 100. This valve also is connected to tank or exhaust through line 101, and to two output lines 105 and 106 which may be alternately connected to supply 95 or exhaust 101 by shifting the valve. Thus, in accordance with the conventional schematic showing of valve 100 in FIG. 1, when line 105 is connected to pressure line 95, as shown, line 106 is connected to exhaust. When the valve is moved to its other position these connections are reversed. Movement of the valve 100 may be provided either by any suitable direct manual control, or by alternately energizing the control solenoids 108, shown in the drawing, through any suitable control.

Line 105 extends through a suitable restrictor or throttling valve 110, having a reverse flow bypass check valve 112, to the inlet passage 75 leading to pressure chamber 67. Line 106 is connected to control passage 77 through a conventional relief or counterbalance valve 120 which is normally closed, but may be preset to open upon a rise in pressure in the passage 77 to a predetermined value. Thus, valve 120 serves to regulate the pressure in chamber 65. This provides a controlled connection between chamber 65 and the exhaust or tank lines 101 when the directional valve is positioned as shown, tending to move piston 25 in a clamping direction, but the locking force exerted through collet 35 is obtained from full supply line pressure, and the restrictor valve 110 will control the speed of advance of piston 25, by controlling the rate of flow through line 105 and thus controlling the rate at which pressure fluid flows into the chamber 67.

A bypass check valve 122 is connected in parallel with counterbalance valve 120 providing for flow through line 106 into passage 77 when directional valve 100 is shifted. When this valve is reversed the high pressure line 95 will connect through check valve 122 to chamber 65, while fluid may pass from chamber 67 through check valve 112 to the exhaust or tank line 101. As shown in the drawings, the side of piston 60 facing chamber 65 is of greater diameter (hence presents a greater area) than the side of land 28 which faces this chamber. Thus, there is a resultant force to the left, as viewed in FIG. 1, which will release the piston 60 from collet 35 and move this piston toward its retracted position. Thus, by appropriate movement of the directional valve 100 the collet 35 may be released and power piston 60 will move rearward, to the left as viewed in FIG. 2, engaging the head 45 on the bearing sleeve 42 and carrying the clamping piston 25 to its rest or retracted position as shown in FIG. 1.

The modified construction shown in FIG. 4 is designed to eliminate the space 34 and equalizing passage 33. Like reference numerals with a prime are employed to designate similar parts. Accordingly, the sleeve member 18' is of uniform internal diameter, and the clamping piston includes an enlarged forward head 28' in place of the land 28, including a suitable sealing ring 29'. Thus, the fluid which might leak around seal 29' merely passes into the space within the flexible seal cover 30', and will not provide any resistance to forward movement of the clamping piston. In all other respects, the construction and operation of the modified mechanism shown in FIG. 4 is the same as previously described.

While the form of apparatus herein described constitutes a preferred embodiment of the invention, it is to be understood that the invention is not limited to this precise form of apparatus, and that changes may be made therein without departing from the scope of the invention as defined in the appended claims.

What is claimed is:

1. Apparatus of the character described comprising means defining a cylinder closed at one end, a clamping piston mounted for axial movement in said cylinder and including a piston rod projecting outwardly from the other end of said cylinder, means carried by said cylinder for locking said clamping piston against axial movement, a power piston in said cylinder and movable axially thereof, said power piston cooperating with said cylinder and with said clamping piston to define a closed chamber for receiving hydraulic fluid, means connected to supply fluid into said chamber, means on said power piston engageable with said locking means for actuation thereof to retain said clamping piston against axial movement, means for driving said power piston in a direction to reduce the volume of said chamber causing movement of said clamping piston through the medium of fluid trapped in said chamber, and control means regulating the pressure of fluid in said chamber to control the clamping force exerted by said clamping piston prior to engagement of said power piston with said locking means.

2. A power operated tailstock for exerting predetermined pressure upon a workpiece, comprising a cylinder, a piston member in said cylinder movable between advanced and retracted positions and having a portion extending out of said piston providing a mounting for a center, means operative on said piston member to lock said piston member against movement axially of said cylinder, movable wall means cooperating with said piston and said cylinder to define a closed chamber, conduit means for conducting hydraulic fluid to and from said chamber, means providing an operating connection between said movable wall means and said locking means for locking said piston member upon predetermined movement of said wall means, means operative to move said wall means in a direction to reduce the volume of said chamber and to move said piston member toward its advanced position, and adjustable control means in said conduit means determining the hydraulic pressure necessary for flow from said chamber and providing a limit to the force exerted by said piston member at said advanced position prior to locking said piston member against axial movement in said cylinder.

3. Apparatus of the character described comprising means defining a cylinder, a clamping piston mounted for axial movement in said cylinder and having a reduced rod portion extending within said cylinder and having a portion extending outside said cylinder for exerting a clamping force in response to predetermined movement of said piston, a split collet member surrounding said rod portion and retained against movement axially of said cylinder, a power piston in said cylinder movable axially thereof, said power piston cooperating with said cylinder and said clamping piston to define a closed chamber for receiving hydraulic fluid, cooperating means on said power piston and said collet operable to contract said collet about said rod portion and retain said clamping piston against axial movement, means for driving said power piston toward said collet and concurrently reducing the volume of said chamber, means connected to conduct fluid into and out of said chamber, and control means regulating the pressure of fluid forced from said chamber through said conducting means to control the force exerted by said clamping piston prior to engagement of said cooperating means on said power piston and said collet.

4. Apparatus of the character described comprising means defining a cylinder, a clamping piston mounted for axial movement in said cylinder and including a piston rod projecting outwardly therefrom in one direction and through said cylinder in the opposite direction, a split collet member surrounding that portion of said piston rod extending through said cylinder, means retaining said collet against movement axially of said cylinder, an annular power piston in said cylinder and mounted in sealing relation with said cylinder and said porton of said piston rod therein, said power piston cooperating with said cylinder and said clamping piston to define a closed chamber for receiving hydraulic fluid, means for driving said power piston toward said clamping piston tending to reduce the volume of said chamber and move said clamping piston axially of said cylinder in the same direction through the medium of hydraulic fluid trapped therebetween, cooperable means on said power piston and said collet operative upon contact thereof to contract said collet about said piston rod and lock said clamping piston against axial movement, and control means regulating passage of fluid from said chamber to control the force exerted through said fluid from said power piston to said clamping piston prior to engagement of said cooperable means and consequent locking of said clamping piston.

5. A power operated tailstock for exerting a predetermined holding pressure upon a workpiece, comprising means defining a cylinder closed at one end, a piston member mounted in said cylinder for axial movement relative thereto, a free piston in said cylinder cooperating with said closed one end thereof and with said piston member to define two separate chambers at opposite ends of said free piston, a split collet surrounding said piston member and positioned in one of said chambers, cooperable means on said free piston and on said collet effective to exert a locking force on said collet for contracting said collet radially against said piston member, means effective to retain said collet against movement axially of said one chamber, means providing hydraulic circuit connections into both said chambers, means connected to supply hydraulic pressure fluid into said other chamber for forcing said free piston toward said collet to advance said piston member through a fluid connection provided by the fluid entrapped in said one chamber, and means connected to provide a predetermined resistance to flow of fluid from said one chamber operative to control the holding pressure which said piston member may exert on a workpiece prior to locking engagement of said collet with said piston member.

6. A power operated tailstock for exerting a predetermined holding pressure upon a workpiece, comprising means defining a cylinder closed at one end, a piston member mounted in said cylinder for axial movement relative thereto, a free piston in said cylinder cooperating with said closed one end thereof and with said piston member to define two separate chambers at opposite ends of said free piston, a split collet surrounding said piston member and positioned in one of said chambers, cooperable means on said free piston and on said collet effective to exert a locking force on said collet for contracting said collet radially against said piston member, means effective to retain said collet against movement axially of said one chamber, means providing hydraulic circuit connections into both said chambers, means connected to supply hydraulic pressure fluid into said other chamber for forcing said free piston toward said collet to advance said piston member through a fluid connection provided by the fluid entrapped in said one chamber, means connected to provide a predetermined resistance to flow of fluid from said one chamber operative to control the holding pressure which said piston member may exert on a workpiece prior to locking engagement of said collet with said piston member, and control means connected to said circuit connections operative to reverse the flow of hydraulic fluid to and from said chambers.

7. A power operated tailstock construction comprising a cylinder and a clamping piston reciprocable in said cylinder including mounting means for a center extending beyond one end of said cylinder, a power piston in said cylinder and defining with said clamping piston a variable volume chamber for containing hydraulic fluid, means for driving said power piston in a direction to reduce the volume of said chamber and exert a clamping force on said clamping piston through the medium of hydraulic fluid contained in said chamber to advance said clamping piston and engage the center with a workpiece, and means connected to conduct hydraulic fluid into and out of said chamber including a control for regulating the pressure necessary for effective flow of fluid out of said chamber to limit the clamping force which may be exerted upon a workpiece by a center mounted on said clamping piston.

8. A power operated tailstock construction comprising a cylinder and a clamping piston reciprocable in said cylinder including mounting means for a center extending beyond one end of said cylinder, a power piston in said cylinder and defining with said clamping piston a variable volume chamber for containing hydraulic fluid, means for driving said power piston in a direction to reduce the volume of said chamber and exert a clamping force on said clamping piston through the medium of hydraulic fluid contained in said chamber to advance said clamping piston and engage the center with a workpiece, means connected to conduct hydraulic fluid into and out of said chamber including a control for regulating the pressure necessary for effective flow of fluid out of said chamber to limit the clamping force which may be exerted upon a workpiece by a center mounted on said clamping piston, and locking means actuatable by said power piston to lock said clamping piston in its clamping position against movement within said cylinder.

9. Apparatus of the character described comprising means defining a cylinder, a clamping piston mounted for axial movement in said cylinder and including a piston rod projecting outwardly therefrom, a power piston in said cylinder mounted for movement axially thereof independently thereof of said clamping piston and having a greater area than said clamping piston, said pistons and said cylinder defining therebetween a closed chamber for receiving hydraulic fluid, means for driving said power piston in a direction to reduce the volume of said chamber and exert a clamping force on said clamping piston through the medium of hydraulic fluid contained in said chamber, interengageable abutment means on said clamping piston and said power piston providing for conjoint movement thereof in response to predetermined movement of said power piston relative to said clamping piston in a direction expanding the volume of said chamber, and means for connecting said chamber to a source of hydraulic fluid under pressure to move said power piston in a direction for engaging said abutment means and moving said clamping piston in the opposite direction thereof from the direction in which said clamping piston exerts said clamping force.

10. A power operated tailstock construction comprising a cylinder and a clamping piston reciprocable in said cylinder including mounting means for a center extending beyond one end of said cylinder, a power piston in said cylinder and defining with said clamping piston a variable volume chamber for containing hydraulic fluid, said power piston having a greater effective area exposed to fluid in said chamber than said clamping piston, means for driving said power piston in a direction to reduce the volume of said chamber and exert a clamping force on said clamping piston through the medium of hydraulic fluid contained in said chamber to advance said clamping piston and engage the center with a workpiece, means connected to conduct hydraulic fluid into and out of said chamber including a control for regulating the pressure necessary for effective flow of fluid out of said chamber to limit the clamping force which may be exerted upon a workpiece by a center mounted on said clamping piston, interengageable abutment means on said clamping piston and said power piston providing a limit to relative movement thereof in a direction expanding the volume of said chamber, and means for selectively introducing hydraulic fluid under pressure into said chamber to withdraw said clamping piston by engagement of said abutment means and movement of said power piston in a direction opposite to the direction in which said clamping force is exerted by said clamping piston.

11. A power operated tailstock construction comprising a cylinder and a clamping piston reciprocable in said cylinder including mounting means for a center extending beyond one end of said cylinder, a power piston in said cylinder and defining with said clamping piston a variable volume chamber for containing hydraulic fluid, said power piston having a greater effective area exposed to fluid in said chamber than said clamping piston, means for driving said power piston in a direction to reduce the volume of said chamber and exert a clamping force on said clamping piston through the medium of hydraulic fluid contained in said chamber to advance said clamping piston and engage the center with a workpiece, means connected to conduct hydraulic fluid into and out of said chamber including a control for regulating the pressure necessary for effective flow of fluid out of said chamber to limit the clamping force which may be exerted upon a workpiece by a center mounted on said clamping piston, means automatically operable to lock said clamping piston in its advanced position, means for automatically unlocking said clamping piston in response to movement of said power piston in a reverse direction, interengageable abutment means on said clamping piston and said power piston providing a limit to relative movement thereof in a direction expanding the volume of said chamber, and means for selectively introducing hydraulic fluid under pressure into said chamber to withdraw said clamping piston by engagement of said abutment means and movement of said power piston in a direction opposite to the direction in which said clamping force is exerted by said clamping piston.

References Cited in the file of this patent
UNITED STATES PATENTS

| | | |
|---|---|---|
| 1,834,831 | Drummond | Dec. 1, 1931 |
| 2,545,852 | Kurzweil | Mar. 20, 1951 |
| 2,614,447 | Lomazzo | Oct. 21, 1952 |
| 2,809,612 | Highberg | Oct. 15, 1957 |
| 2,856,192 | Schuster | Oct. 14, 1958 |